Mar. 6, 1923.
W. E. HOLLAND ET AL.
STORAGE BATTERY CELL.
FILED MAY 10, 1921.
1,447,783.
2 SHEETS—SHEET 1.
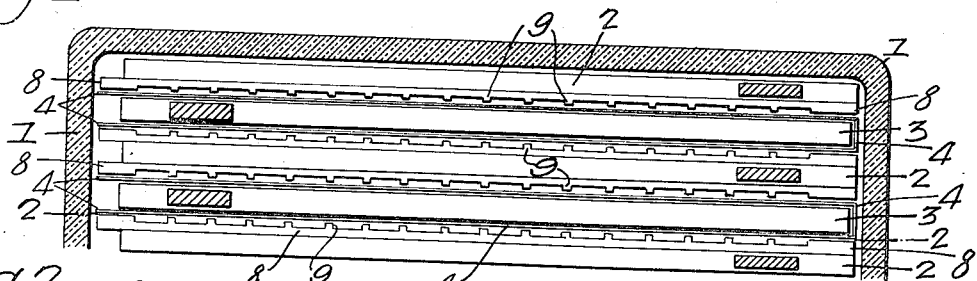
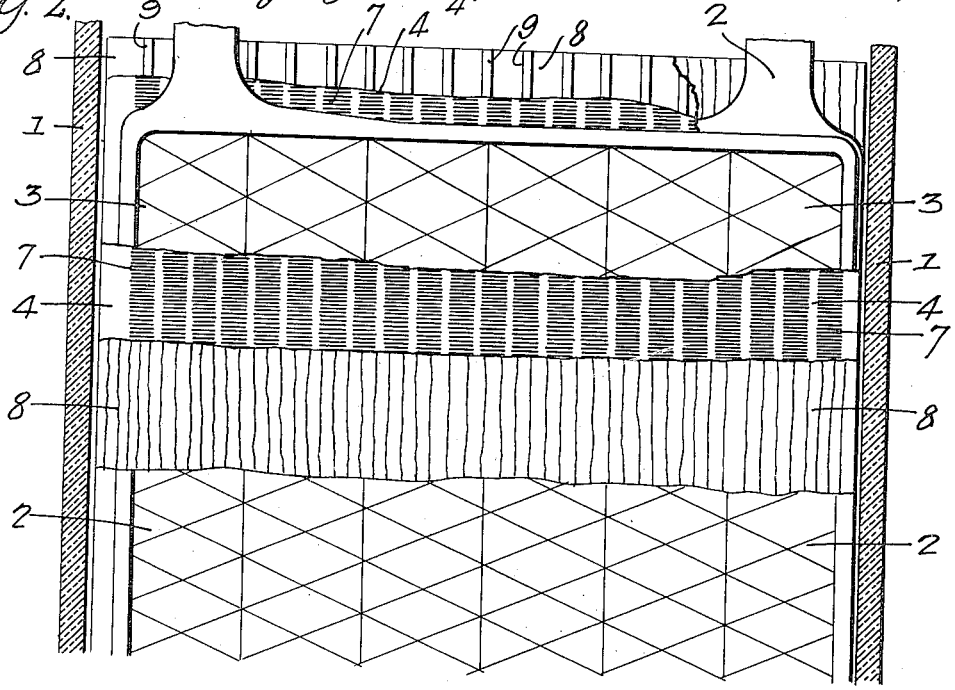
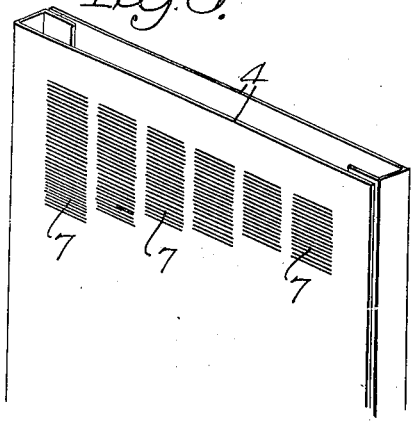
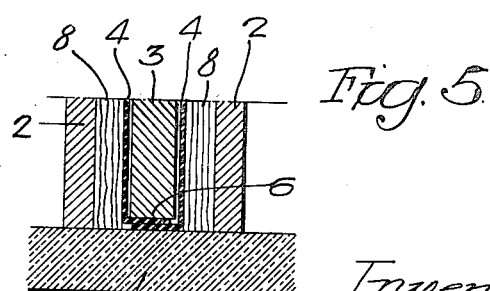
Inventors:
Walter E. Holland.
Lawrence J. Pearson.
by their Attorneys-
Howson & Howson

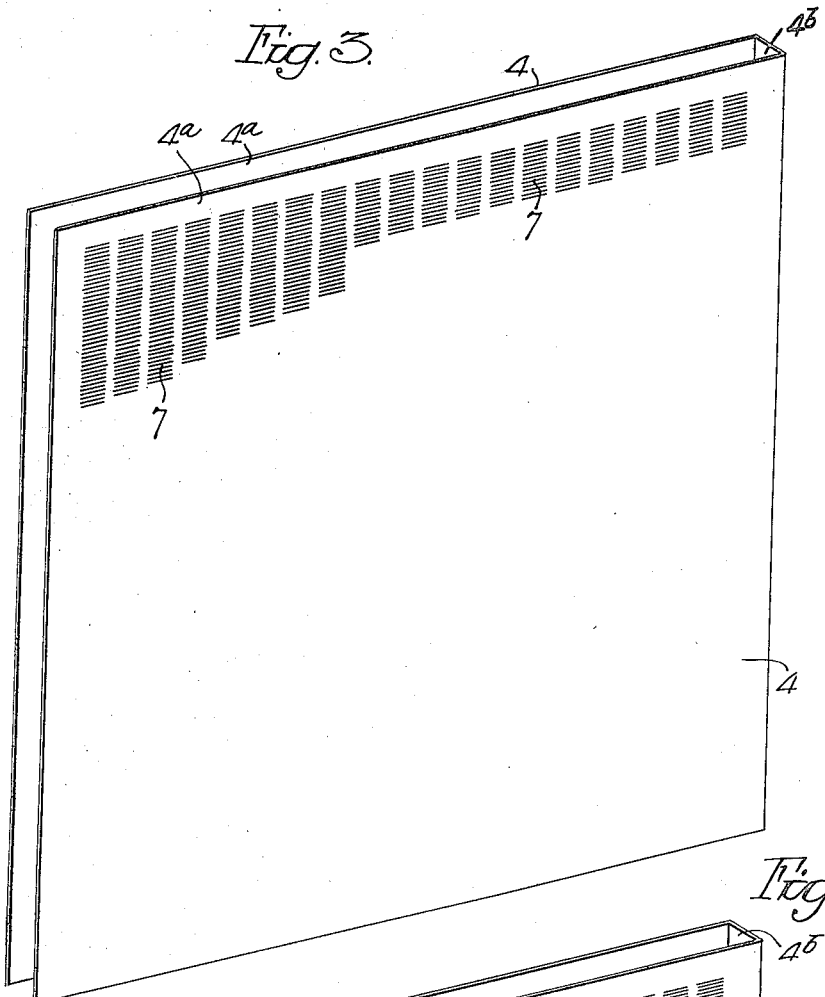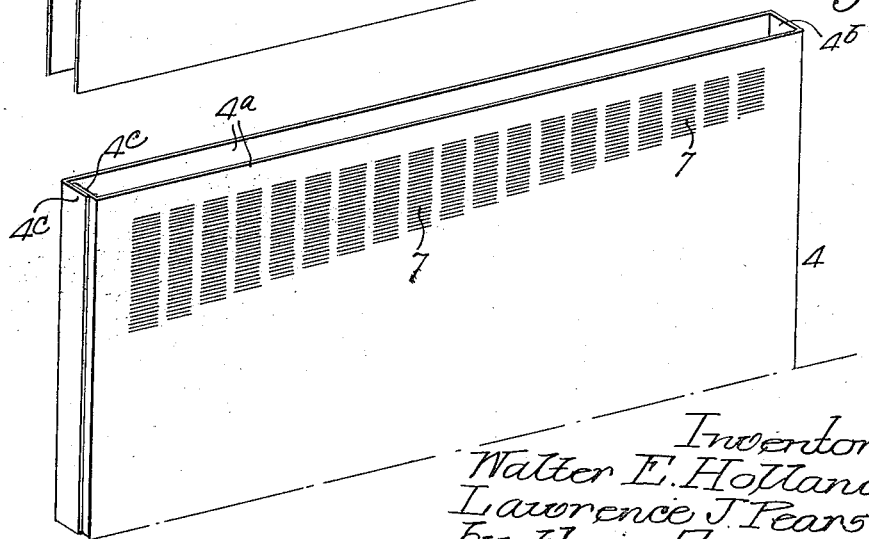

Patented Mar. 6, 1923.

1,447,783

UNITED STATES PATENT OFFICE.

WALTER E. HOLLAND, OF PHILADELPHIA, AND LAWRENCE J. PEARSON, OF WYNCOTE, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE-BATTERY CELL.

Application filed May 10, 1921. Serial No. 468,312.

*To all whom it may concern:*

Be it known that we, WALTER E. HOLLAND and LAWRENCE J. PEARSON, citizens of the United States, residing in Philadelphia and Wyncote, Montgomery County, respectively, both in the State of Pennsylvania, have invented Storage-Battery Cells, of which the following is a specification.

One object of our invention is to provide a storage battery cell with a novel arrangement and construction of separators or plate insulating elements for one or both sets of the plates, especially designed to prevent mossing or short-circuiting between adjacent plates around the edges of said separators.

We also desire to provide a novel form of insulating separator designed not only to retain the active material in the face portions of the plates of a storage battery and protect the wooden separators from injury, but which shall also serve to enclose and insulate the edges of the plates, with a view to preventing the disintegration of the adjacent parts of the plate frame or grid.

The objects and other advantageous ends we attain as hereinafter set forth, reference being had to the accompanying drawings, in which, Fig. 1 is a plan, partly in horizontal section illustrating a storage battery cell equipped with our invention;

Fig. 2 is a vertical section starting on the line 2—2, Fig. 1, showing portions of the various parts broken away for purposes of illustration;

Fig. 3 is a perspective view of one of the slotted separator elements constituting part of our invention;

Fig. 4 is a fragmentary perspective view of a slightly modified form of separator element;

Fig. 5 is a fragmentary vertical section illustrating our invention arranged to enclose the bottom edge of a battery plate; and Fig. 6 is a fragmentary perspective of another modification of our invention.

In the above drawings, 1 represents a battery cell container made of suitable material, within which are mounted any desired numbers of negative plates 2 and positive plates 3. In the case illustrated and in accordance with our invention, each of the positive plates, and if desired, each of the negative plates also, has extending around it a separator element 4 comprising a sheet of hard rubber or equivalent insulating material folded, bent or formed to extend around one vertical edge of the plate and over the opposite faces thereof. Each of these elements thus includes or is made up of two sheets $4^a$—$4^a$ lying immediately adjacent the opposite faces of a plate 3, with a narrow end section or hinge portion $4^b$ extending across and insulating one edge of said plate and integrally connecting said sheets.

The side faces or portions $4^a$ of the separator elements are perforated, being formed in the present case with series of relatively narrow elongated slots 7 of such dimensions as to prevent in a large measure the escape of active material particles from the faces of the positive plate, while permitting free passage of the electrolyte and current.

In addition to the sheet rubber or equivalent separator elements 4, there are also preferably employed wooden separator sheets 8, each of which is mounted between one of the negative plates and the adjacent face of an element 4. That face of each wooden separator plate 8 adjacent the separator element 4 is preferably formed with relatively narrow vertical ribs to provide space between the plates for the free circulation of electrolyte.

It is to be noted that, as shown in Figs. 1 and 2, the width of the portions $4^a$ is such that when the separator element is in position within the container 1, its free vertical edges as well as the edges of the adjacent wood separators 8, project well beyond the otherwise unprotected edges of the plates at the side opposite the hinge $4^b$. If desired however, these free edges may be of such length as to permit of their being bent one toward the other and overlapped as shown at $4^c$ in Fig. 4, so that the separator element completely encloses or extends around the opposite faces and edges of the plate.

In Fig. 6 we have shown a somewhat modified construction of separator element made up of a face portion, an end or hinge portion and a narrow margin formed to be parallel with said face portion. Two of these elements are employed to enclose each plate, the margin of each element lying parallel with and against the free vertical edge of the face portion of a second element.

If desired or found advisable the bottom edges of each separator element may be folded toward each other and overlapped beneath the bottom edge of the plate as indicated at 6 in Fig. 5, so that the active material will be better retained and the plate will be insulated at this edge.

With the above described construction and arrangement of parts, the formation of current conducting bridges known as "moss" or "trees" between the vertical edges of the positive and negative plates is effectually prevented, since said edges are either completely enclosed by the separator elements or are effectually separated by the barriers provided by their free projecting edges. The construction thus prevents short-circuiting of the plates, and with the bottom-enclosing arrangement shown in Fig. 5, also prevents active material dislodged from any of the plates, accumulating at the bottom edges and similarly causing short-circuiting.

By our invention it is possible to secure an increased plate capacity in a jar or container of given internal dimensions without the possibility of the formation of "moss" at the edges of the plates, for it is no longer necessary that the plates be spaced away from both side walls of the containers so that the separators may extend beyond the plate edges at both sides, as would ordinarily be advisable. Moreover by enclosing the edges of the plates in non-porous insulating material, the metallic side frame members are in a large measure protected from oxidation and consequent weakening such as would otherwise occur as a result of the electrolytic action during the operation of the battery.

We claim:

1. The combination in a battery of a container; positive and negative plates therein; with plate insulators each consisting of a free body of sheet material extending over a face of a plate and covering at least one vertical edge.

2. The combination in a battery of a container; positive and negative plates therein; with independently movable plate insulators each consisting of a body of sheet material loosely extending over one face of the plate, around at least one vertical edge and over the other face thereof, certain edges of said insulators being folded toward each other and overlapped.

3. The combination in a battery of a container; positive and negative plates therein; and insulating elements of sheet material each extending around one vertical edge of a plate over the opposite faces thereof and beyond the second vertical edge to form projecting barriers.

4. The combination in a battery of a container; positive and negative plates therein; and at least two insulating elements of sheet material separating each pair of adjacent faces of positive and negative plates, of which insulating elements one extends around one vertical edge of a plate and over both faces thereof while the other projects beyond the second vertical edge of said plate.

WALTER E. HOLLAND.
LAWRENCE J. PEARSON.